Feb. 8, 1949.                W. M. SIESEL                2,461,447
                             YIELDING DRIVE
                          Filed June 30, 1943
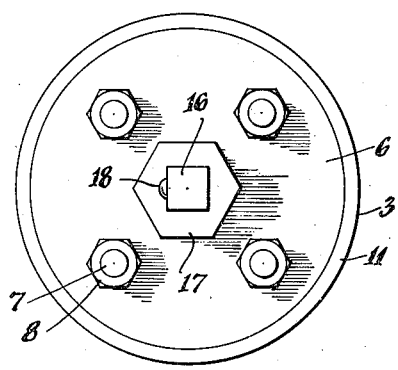
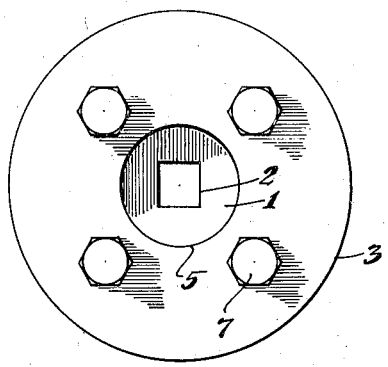
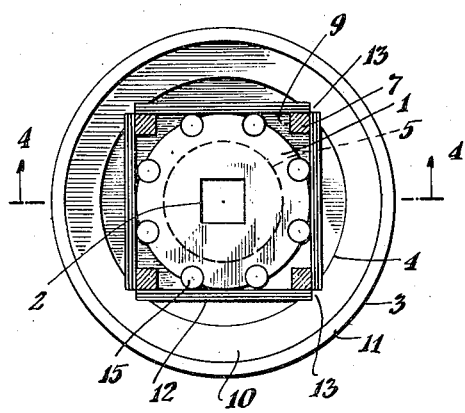
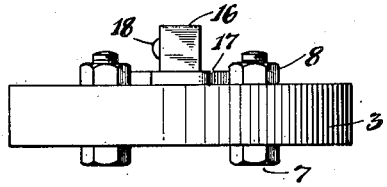
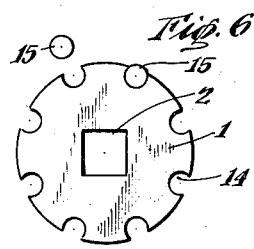
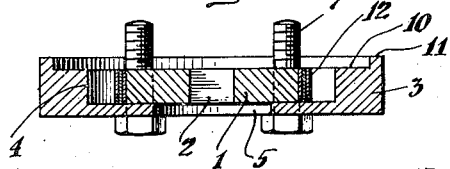
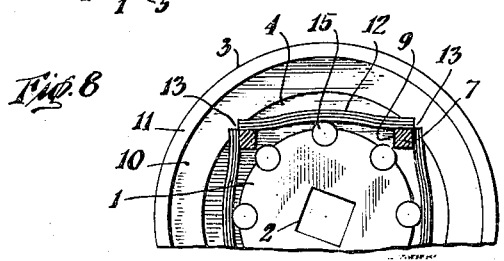
INVENTOR.
William M. Siesel
BY
Blair Curtis & Hayword
ATTORNEYS

Patented Feb. 8, 1949

2,461,447

UNITED STATES PATENT OFFICE 2,461,447

YIELDING DRIVE

William M. Siesel, Morrisville, Pa.; Josephine M. Siesel executrix of said William M. Siesel, deceased Application June 30, 1943, Serial No. 492,973

1 Claim. (Cl. 64—29)

My invention relates to improvements in torque limiting devices; and particularlly to an attachment or appliance for use in combination with a wrench or the like, to enable ordinary mechanical elements, such as bolts and nuts, to be tightened rapidly without risk of damage even though the full power for turning the bolt or nut is applied after the bolt or nut is fully tightened, and even though the power applied to the device may be excessive for the size of the nut or bolt.

It is one object of the present invention to provide a rugged device of the character described which will continue over long periods of service to give substantially accurate operation, yielding at approximately a fixed limit of torque.

It is another object of the invention to provide such a device wherein the necessity for judgment or skill and even careful use is substantially eliminated so that tools operated by such a device can be put into the hands of relatively unskilled workers.

Another object of the invention is to provide a relatively inexpensive device of high quality and to this end it is an object of my invention to use stock parts so far as possible for a wide range of torque limits and to attain the desired limit by interchangeable parts of low cost which can be easily obtained from stock material.

These and other objects I have achieved in my preferred construction by providing a work-engaging or driven member, a driving member to be engaged for connecting the work or tool by a driving connection therewith with a lever or motor or other means for exerting an actuating force thereon, and a yieldable connection between said members consisting of a plurality of spring-pressed cam-follower plates or bearings in one of the said members and a projecting part serving as a cam on the other member, said bearing and cam being yieldably pressed together so as to connect the two members operatively together by the resistance of the spring pressure to camming of said plates. Through said bearings and said cams the driving members normally rotates said driven member; but in the event that the force applied should become excessive, said plates yield to the caming action and the cams slip over said bearing plates. By use of a relatively flat plate as the cam follower, and especially with roller cams, I have avoided the hammering and wear which tends to vary the torque limit during use with existing devices.

In the preferred embodiment of my invention the plates themselves are of spring strip and thus serve also as the springs to resist the action of the cams by their own inherent resiliency. If the ends of these strips are held more or less rigidly in alignment, the effeciveness of the strips is enhanced because a double-bend in each of said strips must be produced before slipping of the cams thereupon. If these plates are laminated from a number of thinner strips, this action is further enhanced by friction between the strips each time such double-bend is produced. At the same time said parts can yield fully to the necessary extent.

Although I have shown in the accompanying drawings and described in this specification the preferred embodiment of my invention and suggested certain modifications and alternatives, it should be understood that these are not intended to be exhaustive or limiting of my invention but on the contrary are given with a view to explaining the principles of the invention and instructing others in the best manner of constructing and using the same in order that others skilled in the art may be enabled to utilize the invention in various embodiments and with various modifications each as may be best adapted to the conditions of a particular use.

In the drawings:

Figure 1 is a top plan view of an appliance according to this invention;

Figure 2 is a bottom plan view of same;

Figure 3 is a top plan view of the interior of the actuator member with the cover removed;

Figure 4 is a view in axial section taken on line 4—4 of Figure 3;

Figure 5 shows a side elevation of the complete unit; and

Figures 6, 7 and 8 present details of structure and mode of operation.

The same numerals identify the same parts throughout.

The device as illustrated comprises an inner cam or roller carrying members 1, shown in the form of a head or disk having a centrally placed hole at 2 to fit a standard socket wrench connection through which a nut or bolt is to be turned up. As shown, the member 1 forms a female connection, but it will be understood that it is not important in the application of my invention what particular type of connection is formed at this point.

This member 1 is enveloped by an outer or housing member including a shallow cup 3 and closure disk or plate 6, the cup being shown most clearly in Figures 3 and 4, with its cavity at 4 and a central aperture 5 in its bottom end wall, and the member 1 being seated in the cavity 4 with the socket hole 2 opposite said aperture or opening 5. The closure plate or cap 6 is affixed to the cup 3 by suitable fastenings, e. g., bolts 7 and nuts 8, the bolts passing through perforations 9 in the bottom end wall of the cup 3 and through plate 6 which rests on a shoulder 10 of the cup 3 and is surrounded by a rim or flange 11. The cam or inner member 1 and the outer housing member or cup 3 are operatively but yieldably connected for transmitting limited torque from one to the other, and to cause the one member to move inoperatively or slip upon the other member if, when the nut or bolt, etc., becomes tight, too much force is still employed. To this end, suitable spring members or plates 12 are mounted in the cavity 4, each conveniently consisting of an assembly of strips of spring steel. The opposite ends of each such plate or assembly are seated in the corners or inwardly exposed recesses 13 indented into the lateral wall of the cavity 4. These plates 12 surround the member 1, their adjacent ends lying close together; and at their midpoints their inwardly disposed surfaces are approximately tangent to the member 1. The mid-portion of the inner strip of each assembly of strips serves as the bearing plate against which the cam rollers 15 act, while the end portions of said plates or strips serve as springs to resist the camming action of the rollers 15 bearing on the plates 12.

The inner member 1 has recesses 14 opening through its periphery and in which are rotatably mounted cylindrical rollers 15 of diameter greater than the depth of the recesses 14, whereby portions of these rollers project beyond said periphery to engage the plates 12 with a camming action and serve to transmit the limited or a predetermined operating force by the resistance of the plates 12 to such camming action. Each plate 12 normally bears against two rollers, one on either side of its center. Hence rotation of the cup 3 in either direction will tend to rotate the inner member 1 but when during such rotation of said inner member 1, the resistance thereof to turning reaches a predetermined limit, the spring members or plates 12 will be bent far enough outwardly to allow the rollers 15 to slip past the centers of the plates 12.

These rollers 15 are of hard steel and may roll in the recesses 14 to reduce and distribute wear. The open sides of these recesses in the rim of the member 1 are narrower than the diameter of the rollers 15 so that the cam rollers must be inserted endwise and lateral displacement is thus avoided.

The closure cap 6 has a projection or tool-fitting boss 16, squared or otherwise shaped for connection to a wrench or other torque device. This projection 16 is formed on and extended from a reinforced central part 17. This boss may be provided with a spring-pressed ball 18, as is customary in connections for socket wrenches and the like; and here, as in the case of the socket hole at 2, the particular type of connection shown is no part of my invention.

As is apparent from Figures 3 and 8, the several holes 9 for the bolts 7 are positioned opposite adjacent corners or recesses 13 of the recess 4 and spaced from adjacent surfaces thereof only by the thickness of the plates 12. Thus the bolts 7 serve not only for holding the closure 6 but also as means for holding the ends of the plates 12 firmly against the walls of the cavity 4 in the corners 13. The operative connection of the work-engaging or driven member and the actuator or driving member is thus rendered more effective by holding the ends of the several spring members or plates 12 more or less rigidly aligned so that whenever the cup 3 slips around the member 1, a double bend is produced in the laminated plates or springs 12, as depicted in Figure 8. This arrangement not only makes the spring parts relatively stronger and stiffer, but also leaves them free to bend and slip over the rollers 15 as much as is required. The squared shanks or intermediate portions of the bolts 7 where they engage the plates or springs 12 enhance this action. The arrangement for producing the double bend may be omitted if desired, and a stiffer spring may be employed to secure the necessary resistance to camming action of the rollers 15.

With an attachment or accessory the kind above described the full advantage of a wrench or more especially of a high speed power driven tool can be obtained, but the nut or bolt is protected against damage by excessive torque, such as twisting off the head or ruining the threads. An appliance according to the present invention is easy to use, for one of the members 1 or 16 is merely engaged with the bolt or nut to be turned, e. g., through a socket wrench, and the other is then revolved by coupling to a suitable power device or lever, etc. The unit is very simple and durable and costs but little to produce. The entire device with the exception of the plates 12 may be made up in a single standard size and form for a wide range of torque limits of predetermined value attained by using different assemblies of stock spring strip material for the plates 12. Each device after assembly and testing may be stamped with its actual torque limit according to the stiffness of the spring assemblies used therein so that one such device may be selected for whatever torque is to be applied in a particular operation.

What I claim is:

In a torque limiting device having a driving member and a driven member rotatably mounted with respect to each other, the combination of a cup-shaped member with an aperture in the bottom of the cup, a drum shaped member seated in said cup and engageable through said aperture and having cam projections on its periphery, a closure plate for said cup, a plurality of bolts extending through the interior of said cup and arranged and adapted to secure said closure plate to the cup, a spring having end portions engaged between interior portions of the cup and intermediate portions of said bolt members, said intermediate portions providing abutments in the cup, and said spring being normally disposed with its projection engaging surface approximately along a geometrical chord of the rotational path of said projections.

WILLIAM M. SIESEL.

REFERENCES CITED

The following references are of record in the file of this patent:

UNITED STATES PATENTS

| Number | Name | Date |
|--------|------|------|
| 458,408 | Schwanhausser | Aug. 25, 1891 |
| 1,895,025 | Griswold | Jan. 31, 1933 |
| 1,962,993 | Leece | June 12, 1934 |
| 2,028,441 | Decker | Jan. 21, 1936 |
| 2,150,611 | Alexander | May 30, 1939 |
| 2,293,786 | Worden | Aug. 25, 1942 |

FOREIGN PATENTS

| Number | Country | Date |
|--------|---------|------|
| 692,761 | Germany | 1940 |